United States Patent [19]
Lee

[11] Patent Number: 5,718,304
[45] Date of Patent: Feb. 17, 1998

[54] FOUR-WHEEL STEERING SYSTEM FOR VEHICLE

[75] Inventor: Unkoo Lee, Kyungki-do, Rep. of Korea

[73] Assignee: Hyundai Motor Co., Seoul, Rep. of Korea

[21] Appl. No.: 424,494

[22] PCT Filed: Nov. 22, 1994

[86] PCT No.: PCT/KR94/00170

§ 371 Date: May 18, 1995

§ 102(e) Date: May 18, 1995

[87] PCT Pub. No.: WO95/16600

PCT Pub. Date: Jun. 22, 1995

[30] Foreign Application Priority Data

Dec. 14, 1993 [KR] Rep. of Korea ............... 93-27572

[51] Int. Cl.$^6$ .................... B62D 5/12; B62D 7/14
[52] U.S. Cl. ................ 180/415; 180/414; 180/433; 91/448
[58] Field of Search ................ 180/414, 410, 180/411, 415, 422, 423; 91/448

[56] References Cited

U.S. PATENT DOCUMENTS

| | | | |
|---|---|---|---|
| 4,144,946 | 3/1979 | Melocik | 180/442 |
| 4,263,979 | 4/1981 | Sturgill | 180/411 |
| 4,778,023 | 10/1988 | Sugasawa | 280/91 |
| 4,781,262 | 11/1988 | Nakamura et al. | 60/386 |
| 4,786,066 | 11/1988 | Kondo et al. | 180/415 |
| 4,821,830 | 4/1989 | Tomoda et al. | 280/91 |
| 4,888,613 | 12/1989 | Zangenfeind et al. | 355/41 |
| 5,052,506 | 10/1991 | Nishimori et al. | 180/414 |
| 5,062,350 | 11/1991 | Tanaka et al. | 91/448 |
| 5,220,974 | 6/1993 | Kim | |
| 5,230,399 | 7/1993 | Plate | 180/414 |
| 5,238,077 | 8/1993 | Vaughn et al. | 180/415 |
| 5,317,513 | 5/1994 | Mouri | 180/415 |
| 5,526,891 | 6/1996 | Goloff | 180/415 |

FOREIGN PATENT DOCUMENTS 9516600 11/1994 WIPO.

*Primary Examiner*—Anne Marie Boehler

[57] ABSTRACT

A four-wheel steering system for a vehicle including a front wheel Steering part having a front direction control valve having ports which close and open in accordance with a rotating direction of a steering wheel, and a front actuator for pushing or pulling a tie rod connected to a front wheel, an electronic control unit for controlling a steering of the rear wheels in response to signals transmitted from a vehicle speed sensor, a steering angle sensor and a steering amount feedback sensor, and a rear wheel steering part having first and second solenoid valves independently controlled by said electronic control, first and second rear direction control valves independently controlled by said electronic control unit and first and second rear wheel actuators for pulling or pushing said rear wheels selectively or simultaneously.

11 Claims, 4 Drawing Sheets

FOUR-WHEEL STEERING SYSTEM FOR VEHICLE

BACKGROUND OF THE INVENTION

(1) Field of the Invention

The present invention relates to a four-wheel steering system and, more particularly, to a four-wheel steering system which can enhance cornering safety by optimally adjusting a rear wheel steering angle in response to the vehicle speed, the front wheel steering angle and the lateral acceleration.

Particularly, the present invention relates to an independent steering system which can independently steer each rear wheel.

(2) Description of Related Art

Generally, a conventional steering system for a vehicle comprises a handling mechanism consisting of a steering wheel, a steering shaft and a column, a gear mechanism consisting of a steering gear mounted on a frame and a link, and a link mechanism consisting of a pitman arm, a drag link and a tie rod.

Such steering systems are designed to adjust the directional orientation of front wheels by gearing the tie rod to the left or right in response to the rotating direction of the gear installed at the end of the steering shaft. In recent years, a power steering system which can improve the handling safety has become popular.

However, since the steering systems are designed such that only the front wheels are steered, a problem that a car body is inclined suddenly and unstable during turns while at high speed occurs. Accordingly, in recent years, a four-wheel steering system which can steer the front wheels and the rear wheels simultaneously has been developed.

Examples of the four-wheel steering system are disclosed in U.S. Pat. Nos. 4,778,023, 4,781,262, 4,821,830, 4,888, 613 and 5,220,974.

However, most of the prior four-wheel steering systems are designed to adjust the rear wheels by only one rear wheel actuator.

This can provide stability during simple cornering but cannot obtain a speedy response of the wheel on the inner side of the turn because of the inertia of the system during a quick lane change or a slalom running. As a result, over steering such that the rear end of the vehicle body is thrown to the outer side of the turn and the marginal performance and stability of the vehicle are deteriorated.

SUMMARY OF THE INVENTION

The present invention is made in an effort to solve above described problems.

It is an object of the present invention to provide a four-wheel steering system which can enhance a cornering safety by optimally adjusting a rear wheel steering angle in response to the vehicle speed, the front wheel steering angle and the lateral acceleration.

It is another object oft he invention to provide an independent steering system which can independently steer each rear wheel.

To achieve the objects, the present invention provides a four-wheel steering system comprising: a steering wheel, front and rear pumps driven by an engine for generating hydraulic pressure, a front direction control valve having ports which close and open in accordance with a rotating direction of the steering wheel, a front actuator having left and right chambers to which the hydraulic pressure is supplied through a fluid passage selected by the front direction control valve, an electronic control unit for controlling a steering of the rear wheels in response to signals transmitted from a vehicle speed sensor, a steering angle sensor and a steering amount feedback sensor, a first solenoid valve for returning the hydraulic pressure generated from the rear pump to a reservoir tank or supplying the hydraulic pressure in response to a signal transmitted from the electronic control unit as an, actuating pressure, a second solenoid valve for returning the hydraulic pressure generated from the rear pump to the reservoir tank or supplying the hydraulic pressure in response to the signal transmitted from the electronic control unit, a first rear direction control valve for changing a flowing direction of the hydraulic pressure supplied from the first solenoid valve in response to the signals from the electronic control unit, a second rear direction control valve for changing a flowing direction of the hydraulic pressure supplied from the second solenoid valve in response to the signal from the electronic control unit, a first rear wheel actuator having left and right chambers into which the hydraulic pressures supplied from the first rear direction control valve flows, a second rear wheel actuator having left and right chambers into which the hydraulic pressures supplied from the second rear direction control valve flows, and two pivot members for adjusting a respective one of the both rear wheels by each first and second rear wheel actuator.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE INVENTION

Figure 1:
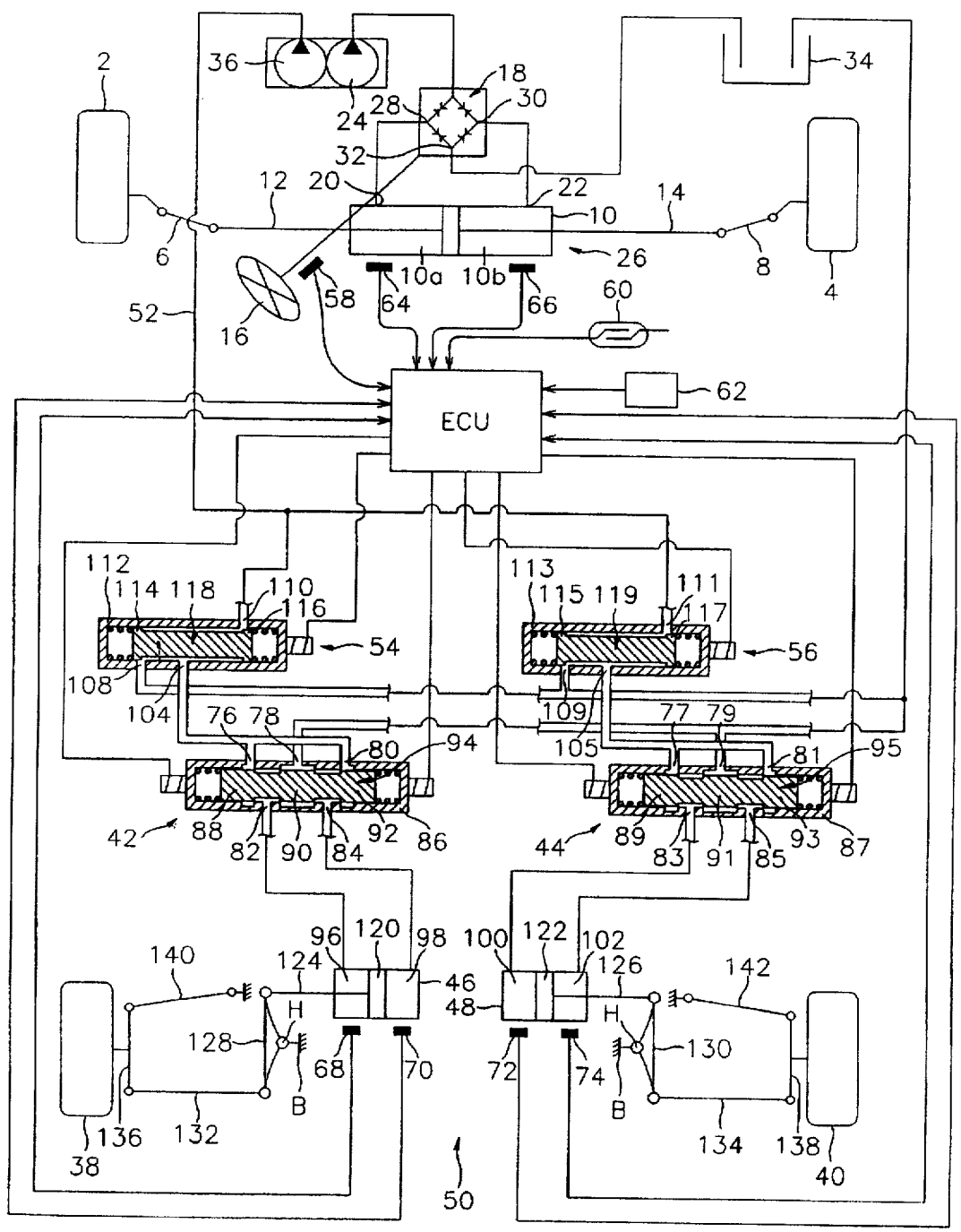
FIG. 1 is a diagram showing a steering system in accordance with a preferred embodiment of the present invention.

FIG. 1 shows a steering system for a vehicle of the present invention in which front wheels 2 and 4 are connected to respective tie rods 6 and 8 by means of universal joints such that the front wheels 2 and 4 are respectively steered by a movement of piston rods 12 and 14 arranged on a respective one of both sides of a front wheel actuator 10.

A front wheel steering part 26 comprises a front direction control valve 18 for controlling a flowing direction of a hydraulic pressure in response to a turning direction of a steering wheel 16 and a front pump 24 for generating the hydraulic pressure. Left and right ports 28 and 30 of the front direction control valve 18 are respectively connected to ports 20 and 22 of each left and right chamber 10a and 10b of the front wheel actuator 10 through fluid passages. An outlet of the front pump 24 is connected to the front direction control valve 18.

The left and right ports 28 and 30 of the front direction control valve 18 are selectively opened in accordance with the turning direction of the steering wheel 16 to supply the hydraulic pressure to the respective left and right ports 20 and 22 of the front wheel actuator 10.

That is, when the vehicle is in a straight ahead position, the left and right ports 28 and 30 close and a bypass port 32 opens such that the hydraulic pressure generated from the front pump 24 flows into a reservoir tank 34.

A rear wheel steering part 50 comprises first and second rear direction control valves 42 and 44 and first and second rear wheel actuators 46 and 48 and receives a hydraulic pressure from a rear pump 36 through a passage 52.

First and second solenoid valves 54 and 56 are connected to the passage 52 to selectively supply the hydraulic pressure to the rear wheel steering part 50 or to return the hydraulic pressure to the reservoir tank 34.

The first and second solenoid valves 54 and 56 and the first and second rear direction control valves 42 and 44 are electrically connected to an output end of an electronic control unit ECU to control the opening and closing of ports thereof in accordance with an output signal of the electronic control unit.

The electronic control unit ECU comprises an input to which a steering angle sensor 58, a vehicle speed sensor 60, an acceleration sensor 62, front wheel steering amount feedback sensors 64 and 66 and a rear wheel steering amount feedback sensors 68, 70, 72 and 74 are connected, thereby receiving signals from each sensor.

When the signals are input to the electronic control unit ECU, the electronic control unit ECU controls the first and second solenoid valves 54 and 56 and the first and second rear direction control valves 42 and 44 to adjust the steering angle of rear wheels 38 and 40.

The first rear direction control valve 42 comprises a valve casing 86 defining five ports 76, 78, 80, 82 and 84 and a valve spool 94 movably disposed in the casing and having three lands 88, 90 and 92 formed thereon.

The second rear direction control valve 44 has the same structure as that of the first rear direction control valve 42. That is, the second rear direction control valve 44 comprises a valve casing 87 having five ports 77, 79, 81, 83 and 85 and a valve spool 95 having three lands 89, 91 and 93 formed thereon.

The ports 78 and 79 of each first and second rear direction control valve 42 and 44 communicate with each other and are connected to the reservoir tank 34. The ports 82 and 84 respectively communicate with the left and right chambers 96 and 98 of the first rear wheel actuator 46. The ports 83 and 85 respectively communicate with the left and right chambers 100 and 102 of the second rear wheel actuator 48.

The ports 76 and 80 of the first rear direction control valve 42 and the ports 77 and 81 of the second rear direction control valve 44 respectively communicate with the outlet ports 104 and 105 of each first and second solenoid valve 54 and 56 to receive the hydraulic pressure therefrom.

The first solenoid valve 54 comprises a valve casing 112 having three ports 104, 108 and 110 and a valve spool 118 having two lands 114 and 116 formed thereon.

The second solenoid valve 56 comprises a valve casing 113 having three ports 105, 109 and 111 and a valve spool 119 having two lands 115 and 117 formed thereon.

Ports 108 and 109 of each first and second solenoid valve 54 and 56 communicate with each other and are connected to the reservoir tank 34. Ports 110 and 111 are connected to the outlet of the rear pump 36 to receive the hydraulic pressure therefrom.

The first and second rear wheel actuators 46 and 48 are mounted to be independent from each other so as not to cooperate with each other.

Pistons 120 and 122 of each actuator 46 and 48 is respectively connected by means of universal joints to pivot members 128 and 130 through piston rods 124 and 126, respectively.

The pivot members 128 and 130 are respectively connected at their respective first and second end to the vehicle body B by means of universal joints and rotate in a clockwise or a counter-clockwise direction in accordance with a moving direction of the respective pistons 120 and 122.

The pivot members 128 and 130 are respectively connected at their respective second ends to the wheel carriers 136 and 138 through first links 132 and 134. The wheel carriers 136 and 138 are connected by means of universal joints to the vehicle body B through second links 140 and 142, respectively, and rotatably support each wheel 38 and 40.

In the steering system of the present invention as described above, when turning the steering wheel 16 leftward during driving, the left port 28 of the front direction control valve 18 opens such that the hydraulic pressure generated by the front pump 24 is supplied to the left chamber 10a of the front wheel actuator 10.

Figure 2:
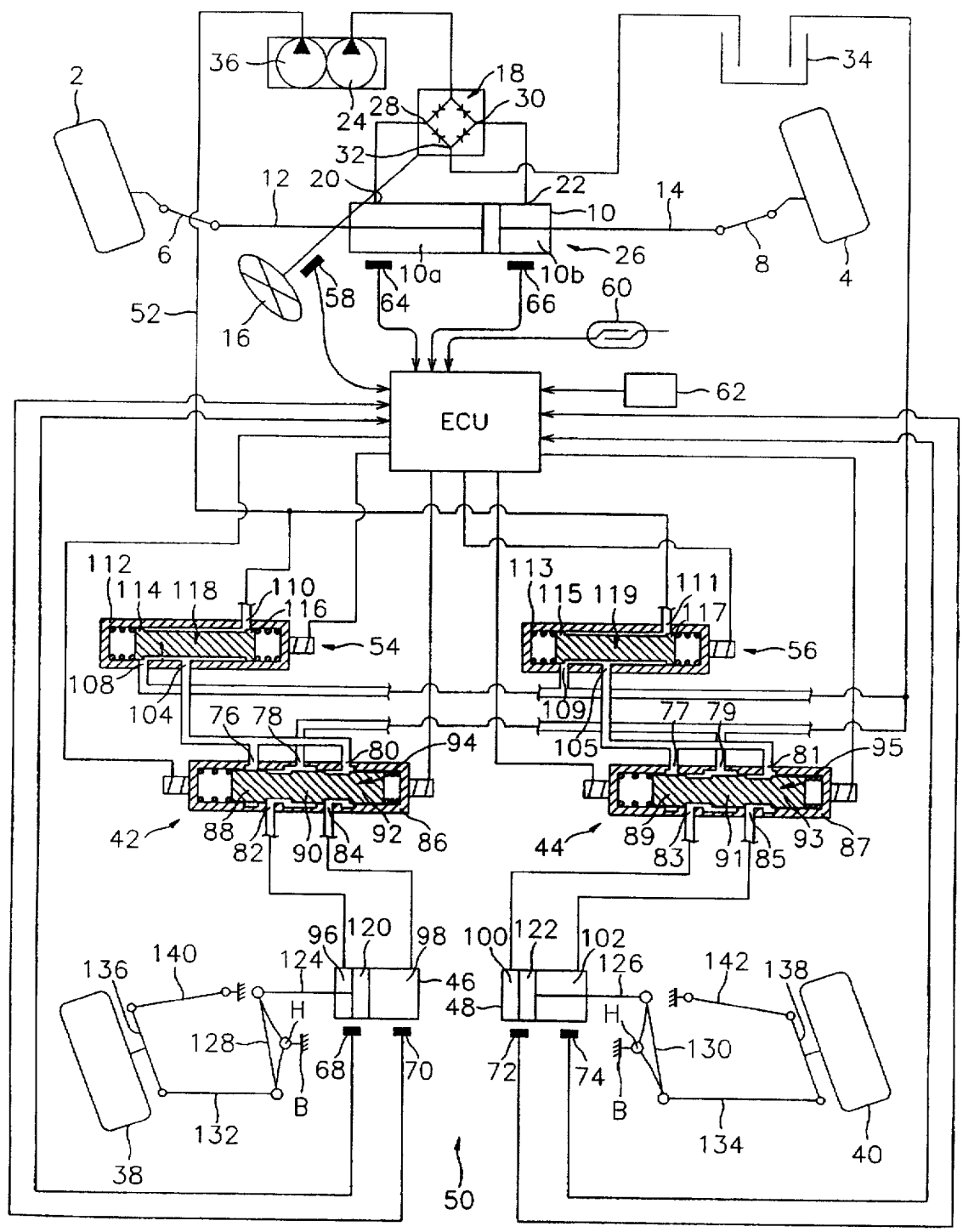
FIG. 2 is a diagram illustrating the steering system which is adjusting the rear wheels to assume the same directional orientation as the front wheels.

As a result, the piston of the front wheel actuator 10 moves rightward as shown in FIG. 2 while pulling the piston rod 12 and pushing the piston rod 14 such that the front wheels 2 and 4 make the turn to the left by the respective tie rods 6 and 8.

At this point, signals sensed by the steering angle sensor, the vehicle speed sensor the lateral acceleration sensor and front wheel steering amount feedback sensors 58, 60, 62, 64 and 66 are input to the electronic control unit.

The input signals are the variable signals which substantially determine the steering action of the rear wheels 38 and 40.

These signals for controlling the steering of the rear wheels are input to one or both of the first and second solenoid valves 54 and 56.

If the signals are input to both of the first and second solenoid valves 54 and 56, as shown in FIG. 2, the valve spools 118 and 119 of each first and second solenoid valve 54 and 56 are positioned in a neutral state.

Accordingly, the hydraulic pressure generated from the rear pump 36 flows into ports 110 and 111 of each first and second solenoid valves 54 and 56 along the passage 52 and flows out through the ports 104, 108 and 105, 109.

At this point, the hydraulic pressures flowing out through a respective one of the ports 108 and 109 return to the reservoir tank 34 and the hydraulic pressure flowing out through the ports 104 and 105 flows into port 76, 80 and 77, 81 of each first and second rear direction control valve 42 and 44.

At this point, since valve spools 94 and 95 of each first and second rear direction control valve 42 and 44 move rightward in the drawing, only hydraulic pressures flowing into each port 80 and 81 flow into the right chamber 98 of the first rear wheel actuator 46 and the right chamber 102 of the second rear wheel actuator 48 through the ports 84 and 85, respectively.

Accordingly, the pistons 120 and 122 of each first and second rear wheel actuator 46 and 48 move leftward, thereby moving each piston rod 124 and 126 leftward.

By this operation, the pivot members 128 and 130 which are connected to the vehicle body B by means of universal joints rotate in the counter-clockwise direction about respective hinge points H. As a result, the first links 132 and 134 connected to the pivot members 128 and 130, respectively, move in an opposite direction to those of the piston rods 124 and 126, respectively, thereby steering the wheel carriers 136 and 138 as shown in FIG. 2.

At this state, the rear wheels 38 and 40 are adjusted to assume the same directional orientation as the front wheels 2 and 4, such that the diameter of the path taken by the rear wheels is more minimized than when the vehicle is steered with only front steerable wheels and cornering safety increases.

On the other hand, when the vehicle changes its running lane abruptly or is in slalom running, inertia of the steering should be reduced to increase the response to the steering. Accordingly, to reduce the inertia of the steering, the steering system of the present invention is designed such that the rear wheel on the outer side of the turn is steered and the rear wheel on the inner side of the turn is in a neutral position.

This becomes possible by controlling the rear wheels independently. Accordingly, in the present invention, when the vehicle makes the turn to the left, as shown in FIG. 3, only the right rear wheel 40 is steered such that when the vehicle makes the turn again to the right and left rear wheel 38 can be immediately steered.

Figure 3:
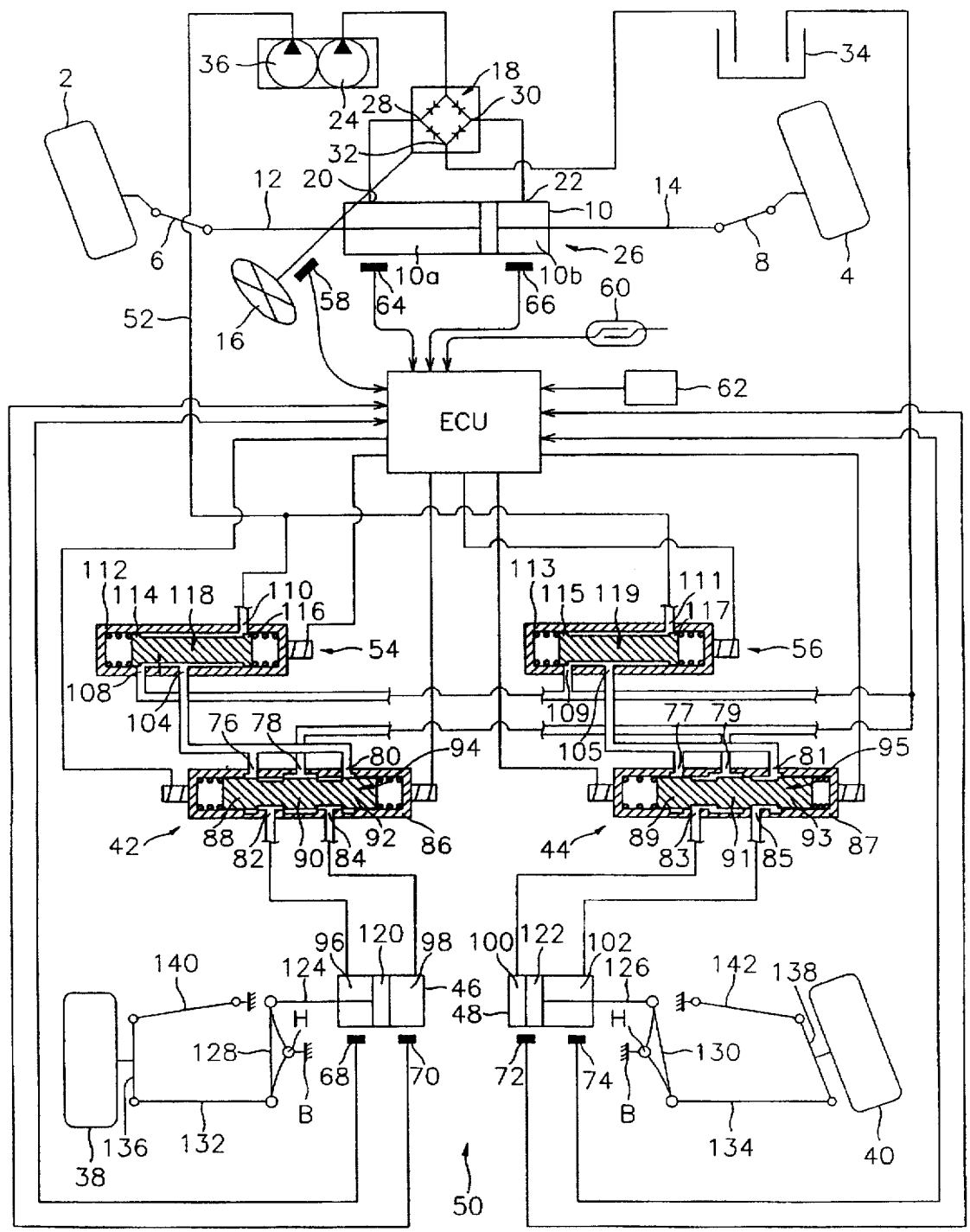
FIG. 3 is a diagram illustrating the steering system which is adjusting only one rear wheel to assume the same directional orientation as the front wheels.

Such selective control of the rear wheels is achieved by controlling the first rear direction control valve 42 as a neutral state and the second rear direction control valve 44 as a state as shown in FIG. 3.

Figure 4:
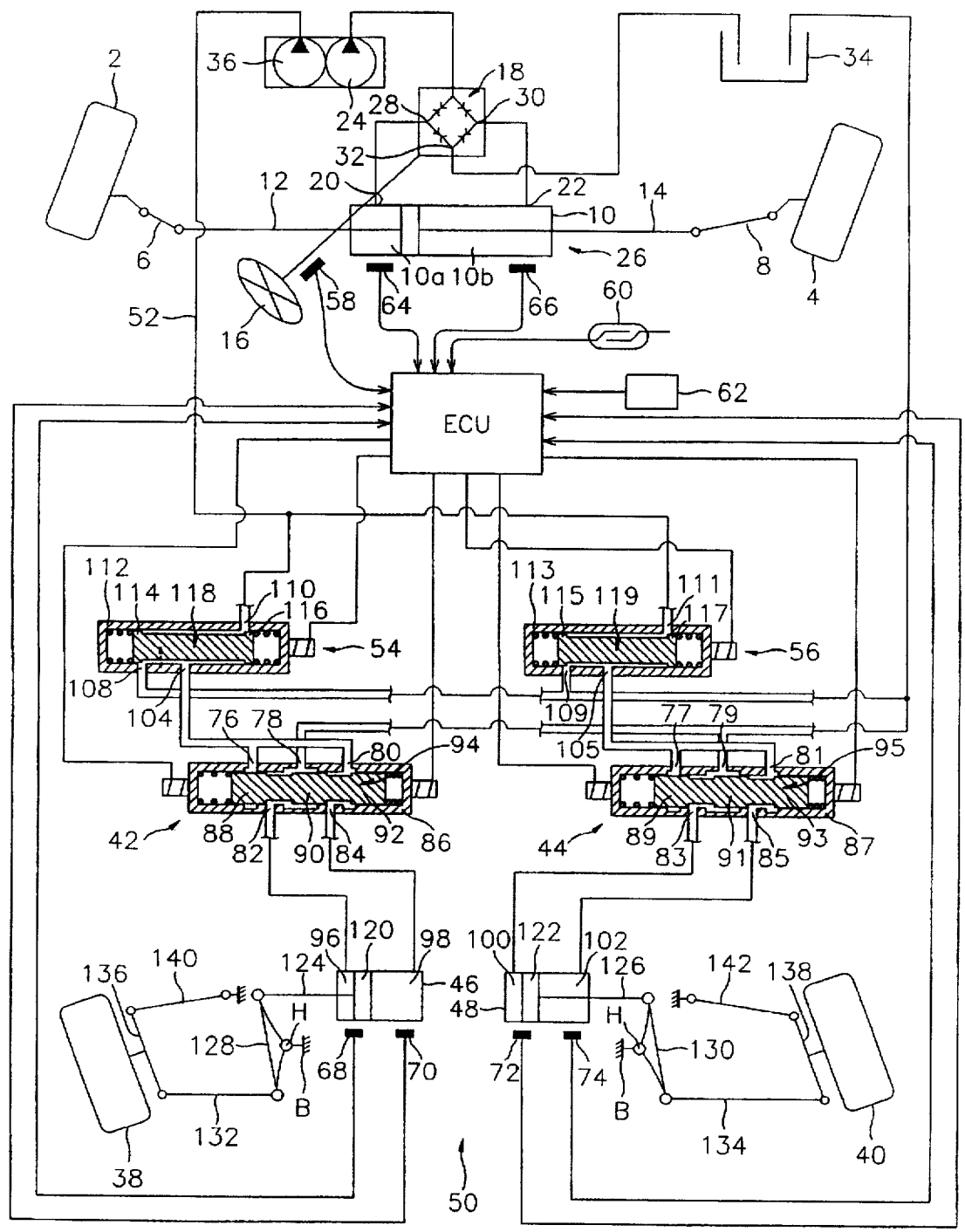
FIG. 4 is a diagram illustrating the steering system which is adjusting the rear wheels to a directional orientation opposite those taken by the front wheels.

FIG. 4 shows a status where the rear wheels 38 and 40 are adjusted to a directional orientation opposite those taken by the front wheels 2 and 4. The front wheels 2 and 4 make a turn to the right while the rear wheels 38 and 40 make and turn to the left.

This adjustment can further reduce the turning diameter of the vehicle compared to when the rear wheels are adjusted to assume the same directional orientation as the front wheels. This selective steering of the rear wheels depends on the signal transmitted from the steering amount feedback sensors 64 and 66.

As described above, in the four-wheel steering system of this invention, the rear wheels are independently controlled by two solenoid valves in response to the turning angle of the steering wheel such that the rear wheels are optimally adjusted in response to the signals transmitted from the electronic control unit ECU.

Further, when the vehicle is at high speed and in a turn, the wheel on the outer side of the turn is steered and the wheel on the inner side of the turn prepares a steering in an opposite direction. When the vehicle is at low speed and in a turn, the rear wheels are adjusted to a directional orientation opposite those taken by the front wheels thereby enabling the vehicle to steer evenly on a narrow road.

Although preferred embodiments of the present invention have been described in detail hereinabove, it should be clearly understood that many variations and/or modifications of the basic inventive concepts herein taught which may appear to those skilled in the pertinent art will still fall within the spirit in the appended claims.

What is claimed is:

1. A four-wheel steering system for a vehicle, comprising:
a steering wheel;
front and rear pumps driven by an engine for generating hydraulic pressure;
a front direction control valve receiving hydraulic pressure generated by the front pump and having ports which close and open in accordance with a rotating direction of said steering wheel;
a front actuator having left and right chambers to which the hydraulic pressure is supplied through a fluid passage selected by said front direction control valve;
an electronic control unit for controlling a steering of the rear wheels in response to signals transmitted from at least a vehicle speed sensor, a steering angle sensor, and a steering amount feedback sensor;
a first solenoid valve for returning the hydraulic pressure generated by said rear pump to a reservoir tank or supplying the hydraulic pressure in response to a signal transmitted from said electronic control unit as an actuating pressure;
a second solenoid valve for returning the hydraulic pressure generated by said rear pump to the reservoir tank or supplying the hydraulic pressure in response to the signal transmitted from said electronic control unit;
a first rear direction control valve for changing a flowing direction of the hydraulic pressure supplied from said first solenoid valve in response to the signals from said electronic control unit;
a second rear direction control valve for changing a flowing direction of the hydraulic pressure supplied from said second solenoid valve in response to the signals from said electronic control unit;
a first rear wheel actuator having left and right chambers into which the hydraulic pressure supplied from said first rear direction control valve flows;
a second rear wheel actuator having left and right chambers into which the hydraulic pressure supplied from said second rear direction control valve flows;
a first pivot member associated with and adjusting one of the rear wheels, and being actuated by said first rear wheel actuator; and
a second pivot member associated with and adjusting another one of the rear wheels, and being actuated by said second rear wheel actuator.

2. The four-wheel steering system according to claim 1, wherein said first solenoid valve comprises a valve casing having a first port for receiving the hydraulic pressure from said rear pump, a second port for returning the hydraulic pressure supplied through the first port to the reservoir tank and a third port for supplying the hydraulic pressure to said first direction control valve, and said second solenoid valve comprises a valve casing having a first port for receiving the hydraulic pressure from said rear pump, a second port for returning the hydraulic pressure supplied through the first port to the reservoir tank and a third port for supplying the hydraulic pressure to the second direction control valve.

3. The four-wheel steering system according to claim 1, wherein said first rear direction control valve comprises a valve casing having first and second ports receiving the hydraulic pressure from said first solenoid valve and a third port for supplying the hydraulic pressure to the left and right chambers of said first rear wheel actuator, and said second rear direction control valve comprises a valve casing having first and second ports receiving the hydraulic pressure from said second solenoid valve and a third port for supplying the hydraulic pressure to the left and right chambers of said second rear wheel actuator.

4. The four-wheel steering system according to claim 1, wherein said first and second solenoid valves are independently controlled by said electronic control unit, and said first and second rear direction control valves are also independently controlled by said electronic control unit.

5. The four-wheel steering system according to claim 1, wherein each of the first and second pivot member is connected to a wheel carrier by means of a first link and connected to a vehicle body by means of a universal joint.

6. The four wheel steering system according to claim 5, wherein the wheel carrier is connected to the vehicle body by means of a universal joint.

7. A four-wheel steering system for a vehicle, comprising:

front wheel steering means for controlling a steering angle of front wheels of said vehicle;

rear wheel steering means for independently controlling a steering angle of first and second rear wheels of said vehicle, said rear wheel steering means including, first and second rear wheel actuators changing said steering angles of said first and second rear wheels, respectively, first and second direction control valves respectively controlling whether said first and second rear wheel actuators change said steering angles of said first and second rear wheels by controlling a direction in which the hydraulic pressure flows, and first and second solenoid valves controlling supply of hydraulic fluid to said first and second direction control valves, respectively; and an electronic control unit independently controlling said first and second solenoid valves and said first and second direction control valves, and controlling said front wheel steering means.

8. The four-wheel steering system of claim 7, wherein said front wheel steering means comprises:

a front actuator, associated with each front wheel, pushing and pulling a tie rod connected to said associated front wheel.

9. The four wheel drive steering system of claim 7, wherein the electronic control unit controls the front and rear wheel steering means such that the rear wheels have the same directional orientation as the front wheels.

10. The four wheel drive steering system of claim 7, wherein the electronic control unit controls the front and rear wheel steering means to steer only the front wheels and one of the first and second rear wheels on an outer side of a turn when the vehicle changes a running lane abruptly or is in a slalom running.

11. The four wheel drive steering system of claim 7, wherein the electronic control unit controls the front and rear wheel steering means in response to signals transmitted from at least a vehicle speed sensor, a steering angle sensor, and a steering amount feedback sensor.

* * * * *